T. R. MARKILLIE.
Whiffletree.
No. 49,285. Patented Aug. 8. 1865.
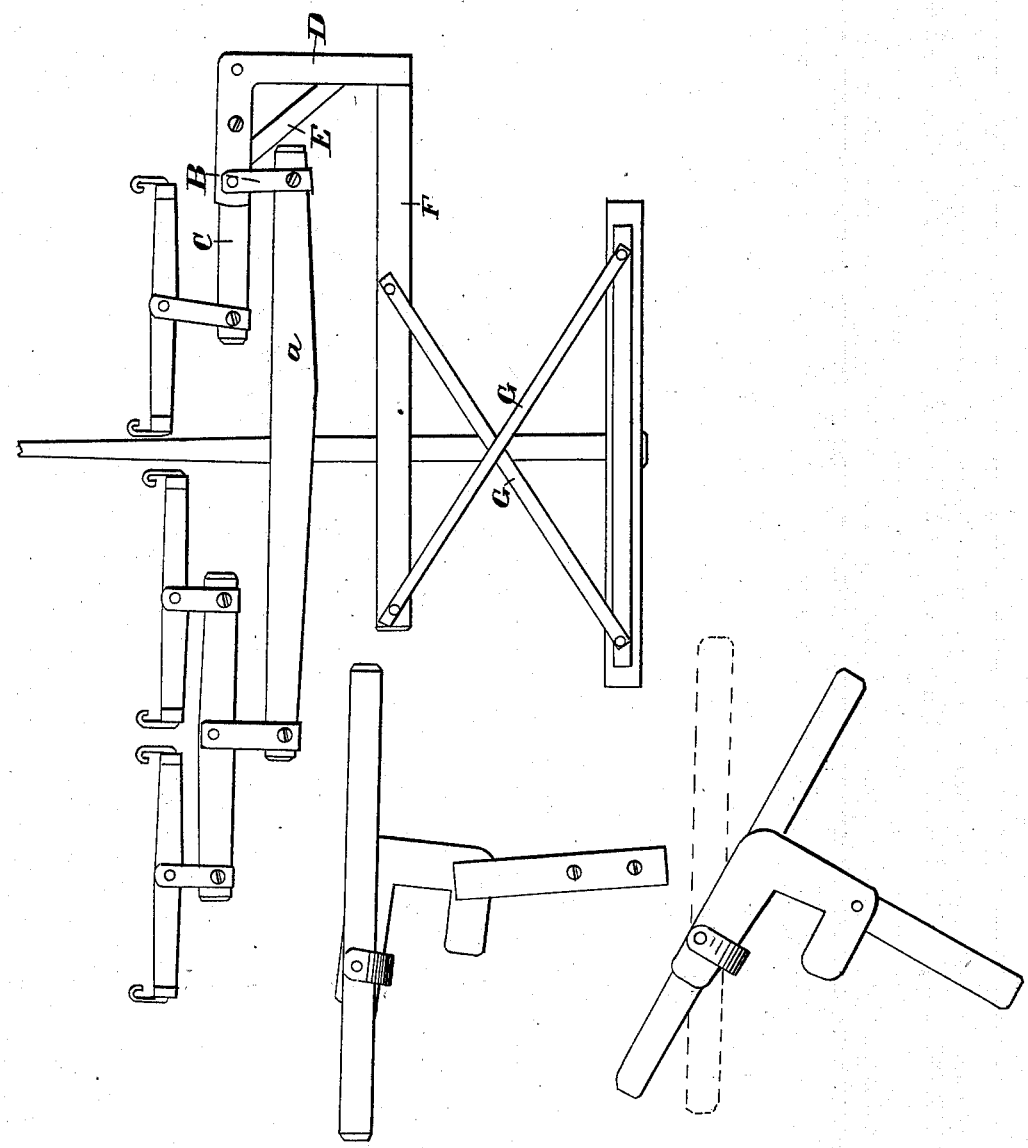

UNITED STATES PATENT OFFICE.

THOS. R. MARKILLIE, OF WINCHESTER, ILLINOIS.

IMPROVEMENT IN WHIFFLETREES.

Specification forming part of Letters Patent No. 49,285, dated August 8, 1865.

*To all whom it may concern:*

Be it known that I, THOMAS R. MARKILLIE, of Winchester, Scott county, and State of Illinois, have invented a new and useful Improvement in Whiffletrees; and I do hereby declare the following is a full, clear, and exact description of the construction and operation of the same, reference being had to the annexed drawings, making a part of this specification, in which—

Figure 1 is a bird's-eye view.

The nature of my invention consists in providing means for working three horses abreast upon the same lever in such a manner as to give to each his due proportion of labor, and at the same time allow them all to stand closely together.

My invention further provides means for regulating and adjusting the action of the weight and strength of the animals in such manner that the weight and strength of the two horses working upon one end of the lever shall be counterbalanced by the single horse upon the other end thereof, so that the strength of the three shall always be brought to bear upon the center of the lever, and thereby prevent the vehicle or thing to be moved from being drawn sidewise.

To effect these objects I attach an ordinary double whiffletree to the end of a lever, A, as represented on the drawing. To the opposite end of the lever A, I attach a brace or strap, B, which connects it to the lever C at a point near the center thereof. The whiffletree for the single horse is attached to the inside end of the lever C at such a distance from the brace or strap B as will secure the desired length of lever upon the lever A to counterbalance with the strength of the single horse the strength of the two horses attached to the opposite end thereof. The outer end of lever C is connected with another lever, which is marked F on the drawing, by means of the braces D and E, the latter of which is placed diagonally from a point near the junction of the brace B and lever C and the outer end of said lever F. The lever F extends from its junction with braces D and E, and parallel with lever A, to a point about one-third of the distance between the center of the lever A and the strap by which it is connected with the double whiffletree. I connect the lever F to the axle-tree of the vehicle to be moved by two strong braces, (marked G,) which cross each other near their centers, and are fastened respectively to the said lever F and the said axle-tree.

It will readily be perceived by the arrangement above described the strength of the single horse is aided by my devices in keeping the load to be moved from being drawn sidewise or diagonally toward the single horse. The force exerted by the single horse draws forward the inside end of the lever C and pushes back the outer end of the lever F. The same force is communicated to the braces G, which, in turn, act upon the axle-tree of the vehicle and crowd the same away from the single horse and toward the double whiffletree, thus fully establishing a compensating action for the superior force and strength of the two horses over the single one.

What I claim as new of my invention, and desire to secure by Letters Patent, is—

1. The levers C and F, combined with each other and with braces D and E, constructed and operated substantially as and for the purposes specified.

2. In combination with devices for working three horses abreast, the braces G, constructed and operated as and for the purposes specified, substantially as described.

THOS. R. MARKILLIE.

Witnesses:
S. M. MARTIN,
S. S. DUNCAN.